United States Patent [19]

Crimp et al.

[11] Patent Number: 5,545,428

[45] Date of Patent: Aug. 13, 1996

[54] METHOD OF PREPARING A SUSPENSION OF PARTICLES AND RELATED METHODS

[75] Inventors: Melissa J. Crimp, Haslett; Brett A. Wilson, East Lansing; Christopher J. Suydam, Royal Oak; Martin A. Crimp, Haslett, all of Mich.

[73] Assignee: The Board of Trustees Operating Michigan State University, East Lansing, Mich.

[21] Appl. No.: 405,390

[22] Filed: Mar. 15, 1995

Related U.S. Application Data

[63] Continuation of Ser. No. 131,708, Oct. 5, 1993, abandoned.

[51] Int. Cl.$^6$ ............................................. B05D 5/12
[52] U.S. Cl. .......................... 427/8; 427/180; 427/212; 252/313.1
[58] Field of Search ........................ 427/8, 180, 212, 427/430.1, 443.2; 252/313.1

[56] References Cited

U.S. PATENT DOCUMENTS

| 4,569,920 | 2/1986 | Smith-Johannsen | 501/1 |
| 4,643,822 | 2/1987 | Parsonage | 209/8 |
| 5,043,048 | 8/1991 | Muralidhara | 204/186 |
| 5,180,585 | 1/1993 | Jacobson et al. | 424/405 |

FOREIGN PATENT DOCUMENTS 2214178  10/1991  United Kingdom.

OTHER PUBLICATIONS

"Kinetics of Heterocoagulation. 3. Analysis of Effects Causing the Discrepancy Between the Theory and Eperiment", Hiroshi Kihira and Egon Matijev Langmuir, 1992.

"Effect of Colloid Stability in Multilayer Deposition", N. Ryde, H. Kihira and E..Matijevic; Journal of Colloid and Interface Science, vol. 151, No. 2 Jul. 1992.

"Kinetics of Heterocoagulation. A.Comparison of theory and experiment"; H. Kihira, N. Ryde and E. Matijevic; Colloids and Surfaces, 64 (1992).

"An Assessment of Heterocoagulation Theories"; H. Kihira and E. Matijevic; Advances in Colloid and Interface Science, 42 (1992) 1–31.

*Primary Examiner*—Shrive Beck
*Assistant Examiner*—Brian K. Talbot
*Attorney, Agent, or Firm*—Bliss McGlynn, P.C.

[57] ABSTRACT

A method for preparing a suspension for coating a substrate with particles which includes determining a pH range in which the heterostability ratio of the substrate and the particles:

$$W_{12} = (a_1 + a_2) \int_{(a_1 + a_2)}^{\infty} \exp(V_T/kT) \, (dr/r^2)$$

is less than $10^{10}$, the homostability ratio of the substrate:

$$W_{11} = 2a_1 \int_{2a_1}^{\infty} \exp(V_T/kT) \, (dr/r^2)$$

is greater than $10^{10}$, and the homostability ratio of the particles:

$$W_{22} = 2a_2 \int_{2a_2}^{\infty} \exp(V_T/kT) \, (dr/r^2)$$

is greater than $10^{10}$, wherein $a_1$ is the radius of the substrate, $a_2$ is the radius of the particles, $V_T$ is the total potential energy of the interaction between component i and component j, wherein i and j are the consecutive subscripts of the stability ratio being considered, T is temperature, k is Boltzmann's constant, and r is distance which varies from $(a_i+a_j)$ to infinity. The suspension is useful for coating the substrate with the suspended particles by exposing the substrate to the suspension.

16 Claims, 2 Drawing Sheets

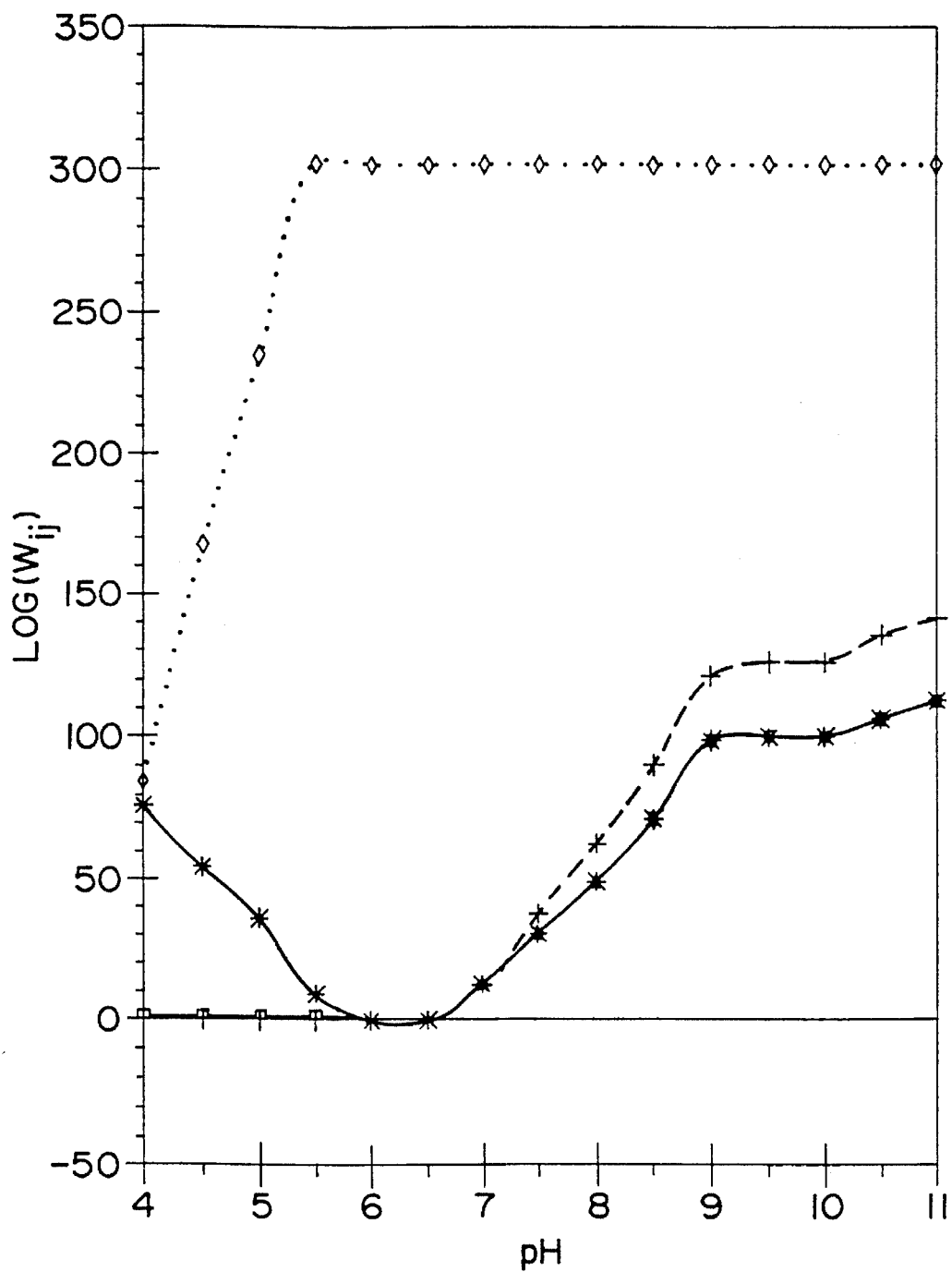

METHOD OF PREPARING A SUSPENSION OF PARTICLES AND RELATED METHODS

This is a continuation of U.S. patent application Ser. No. 08/131,708, filed Oct. 5, 1993 now abandoned.

BACKGROUND OF THE INVENTION

1. Field of the Invention

The present invention relates generally to methods for preparing suspensions of particles and, more specifically, to methods for preparing stable and unstable suspensions of particles and suspensions of particles for coating substrates, and to methods for coating substrates with the suspended particles.

2. Description of the Related Art

Composite materials formed of metallic compounds and reinforcing substrates, such as fibers, are useful in making high-temperature stable structural parts, such as those found in the automotive and aerospace industries. These composite materials have been synthesized using powder metallurgy, thermal spray, and liquid pressure casting techniques. While these techniques produce fairly good composite materials, they are not without their problems. For example, an organic binder is typically used in making the composite materials which must be burned off in the production process. The use of binder not only adds another step in the process, but is a potential source of contamination for the composite material.

Additionally, the above-mentioned techniques for forming composite materials with fibers achieve the best results using large diameter, single-strand fibers while optimum composite structure may require small diameter, multi-strand fibers to insure a good distribution of the fibers.

Some prior art methods which deposit metallic compounds onto fibers, such as arc or plasma spraying, eliminate the need for the binder. However, arc and plasma spraying can be prohibitively expensive and are limited to large diameter, single-strand fibers.

Attempts to produce composite materials formed of NiAl and multi-strand $Al_2O_3$ reinforcing fibers by liquid infiltration and pressure casting have had limited success. During these methods, liquid NiAl is unable to adequately wet the $Al_2O_3$ fibers, so many of the individual $Al_2O_3$ fibers bond together. The areas of fiber-fiber bonding allow the propagation of cracks, thus, decreasing the strength of the composite material.

Ceramic materials are another common material used in the automotive and aerospace industries today. Ceramic materials are typically prepared by processing suspensions of raw material powders into a green body followed by heat treatment, causing densification of the body and microstructural development. Uniformity among the raw material powders in the green body is important as it governs the microstructures of the densified body. Difficulties with forming ceramics arise from the inability of reproducibly making ceramics having identical microstructures and properties. The formation of non-uniform ceramics is caused by inhomogeneities which are a direct result of agglomerates present while the raw material powders are in suspension. The preparation of well-dispersed stable suspensions helps to alleviate the problems caused by agglomeration and leads to the formation of a uniform densified ceramic body.

In addition, new processing methods require alternating from stable suspensions to unstable suspensions (which contain large, loosely-bound agglomerates) or vice versa. Such processing methods prevent segregation of the raw material powders and make it possible to remove undesired ingredients, such as salts and surfactants, by washing.

SUMMARY OF THE INVENTION

It is, therefore, one object of the present invention to provide an improved method for coating substrates, such as fibers, with particles.

It is yet another object of the present invention to provide a commercially-viable method for preparing suspensions of particles which are useful for coating substrates to ultimately make uniform composite materials of the coated substrate without the need for a binder.

It is still another object of the present invention to provide a method for preparing suspensions of particles which are useful for coating relatively small diameter, multi-strand fibers with the particles suspended.

It is a further object of the present invention to provide a method for preparing stable or unstable suspensions of particles.

It is yet another object of the present invention to provide a method for preparing stable suspensions of particles which are easily altered to form unstable suspensions and vice versa.

To achieve the foregoing objects, one embodiment of the present invention is a method for preparing a suspension for coating a substrate with particles which includes determining a pH range in which (i) the heterostability ratio ($W_{12}$) of the substrate and the particles in an aqueous medium, defined by the equation:

$$W_{12} = (a_1 + a_2) \int_{(a_1 + a_2)}^{\infty} \exp(V_T/kT) \, (dr/r^2)$$

is less than $10^{10}$, (ii) the homostability ratio ($W_{11}$) of the substrate in the aqueous medium, defined by the equation:

$$W_{11} = 2a_1 \int_{2a_1}^{\infty} \exp(V_T/kT) \, (dr/r^2)$$

is greater than $10^{10}$, and (iii) the homostability ratio ($W_{22}$) of the particles in the aqueous medium, defined by the equation:

$$W_{22} = 2a_2 \int_{2a_2}^{\infty} \exp(V_T/kT) \, (dr/r^2)$$

is greater than $10^{10}$. In the above equations, the subscript "1" represents the substrate and the subscript "2" represents the particles, $a_1$ is the radius of the substrate, $a_2$ is the radius of the particles, $V_T$ is the total potential energy of the interaction between component i and component j, wherein i and j are the consecutive subscripts of the stability ratio being considered, T is the temperature at which the method is to be performed, k is Boltzmann's constant, and r is distance which varies from $(a_i+a_j)$ to infinity. Once the proper pH range is determined, a suspension of the particles in the aqueous medium is formed having a pH in the determined pH range, and the substrate is exposed to the suspension, thereby causing the particles to coat the substrate.

Another embodiment of the present invention is a method for preparing a stable suspension containing particles of a first composition and particles of a second composition which includes determining a pH range in which (i) the heterostability ratio ($W_{12}$) of the particles of the first composition and the particles of the second composition in an aqueous medium, defined by the equation:

$$W_{12} = (a_1 + a_2) \int_{(a_1 + a_2)}^{\infty} \exp(V_T/kT) \, (dr/r^2)$$

is greater than $10^{10}$, (ii) the homostability ratio ($W_{11}$) of the particles of the first composition in the aqueous medium, defined by the equation:

$$W_{11} = 2a_1 \int_{2a_1}^{\infty} \exp(V_T/kT) \, (dr/r^2)$$

is greater than $10^{10}$, and (iii) the homostability ratio ($W_{22}$) of the particles of the second composition in the aqueous medium, defined by the equation:

$$W_{22} = 2a_2 \int_{2a_2}^{\infty} \exp(V_T/kT) \, (dr/r^2)$$

is greater than $10^{10}$, wherein the subscript "1" represents the particles of the first composition and the subscript "2" represents the particles of the second composition, $a_1$ is the radius of the particles of the first composition, $a_2$ is the radius of the particles of the second composition, $V_T$ is the total potential energy of the interaction between component i and component j, wherein i and j are the consecutive subscripts of the stability ratio being considered, T is the temperature at which the method is to be performed, k is Boltzmann's constant, and r is distance which varies from $a_i+a_j$ to infinity. Once the pH range for the stable suspension is determined, a suspension of the particles is formed in the aqueous medium having a pH in the determined pH range.

Yet another embodiment of the present invention is a method for preparing an unstable suspension containing particles of a first composition and particles of a second composition. The method includes determining a pH range in which (i) the heterostability ratio of the particles of the first composition and the particles of the second composition in an aqueous medium, (ii) the homostability ratio of the particles of the first composition in the aqueous medium, and (iii) the homostability ratio of the particles of the second composition in the aqueous medium are each less than $10^{10}$. Once the pH range for the unstable suspension is determined, a suspension of the particles is formed in the aqueous medium having a pH in the determined pH range.

One advantage of the present invention is that an improved method is provided for coating substrates, such as fibers, with particles. Another advantage of the present invention is that a commercially-viable method is provided for preparing suspensions of particles which are useful for coating substrates to ultimately make uniform composite materials of the coated substrates without the need for a binder. Yet another advantage of the present invention is that a method is provided for preparing suspensions of particles which are useful for coating relatively small diameter, multi-strand fibers with the particles suspended. Still another advantage of the present invention is that a method is provided for preparing stable suspensions of particles which are easily altered to form unstable suspensions and vice versa.

Other objects, features, and advantages of the present invention will be readily appreciated as the same becomes better understood after reading the subsequent description taken in conjunction with the appendant drawings.

BRIEF DESCRIPTION OF THE DRAWINGS

FIG. 2 is a graph showing the log of the stability ratios of the combination of SiC and $Si_3N_4$ powders in an aqueous suspension vs. pH of the suspension.

DESCRIPTION OF THE PREFERRED EMBODIMENT(S)

Figure 1:
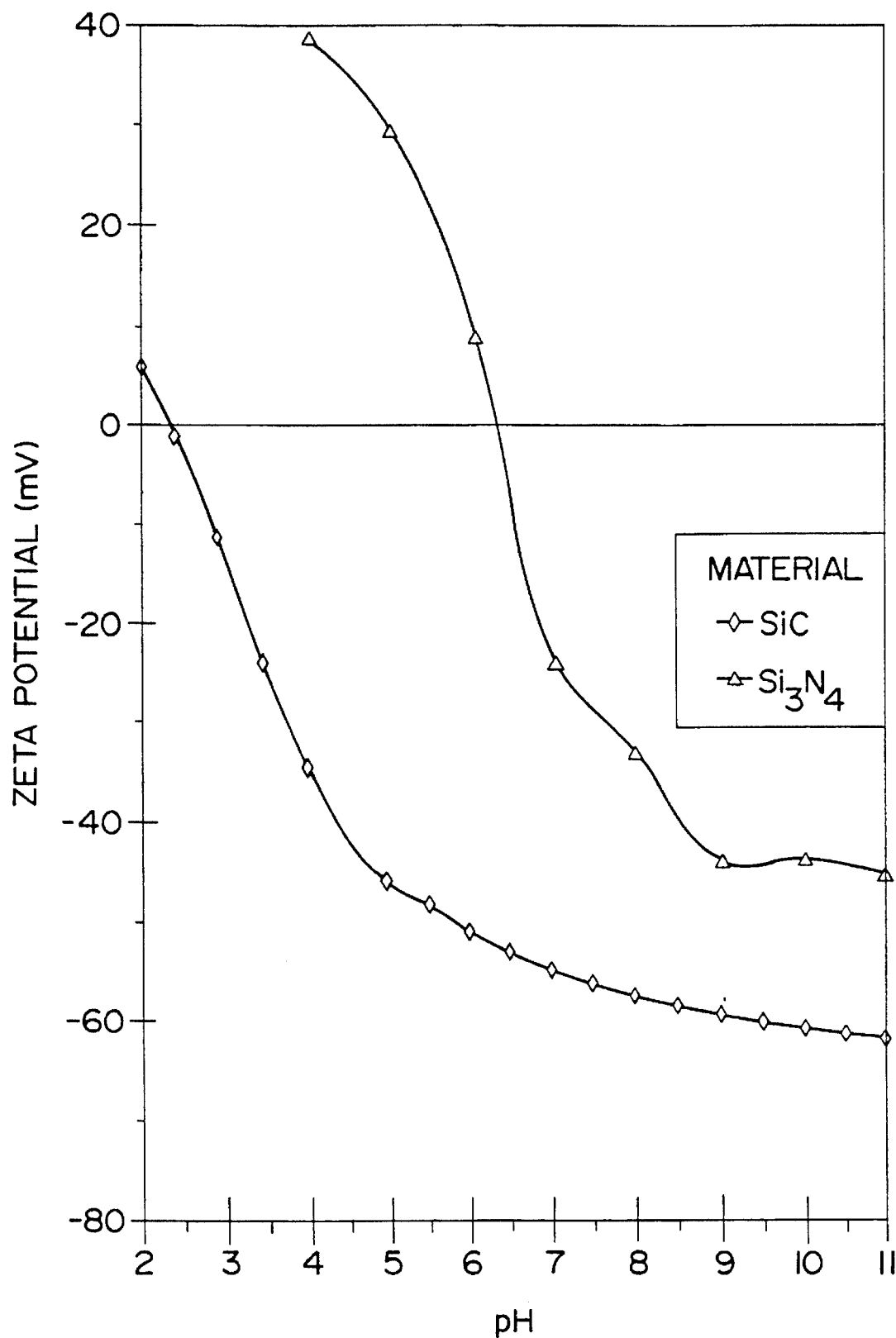
FIG. 1 is a graph showing the zeta potentials of SiC and $Si_3N_4$ powders in an aqueous suspension vs. pH of the suspension.

One embodiment of the present invention generally concerns a method for preparing a suspension for coating a substrate with particles. The method includes determining a pH range of the suspension of particles in an aqueous medium in which the particles are relatively more attracted to the substrate than they are to themselves. Once the proper pH range has been determined, a suspension of the particles having a pH in the proper pH range is prepared in the aqueous medium. Thereafter, the substrate is exposed to the suspension, e.g., by placing the substrate into the suspension, whereby the substrate is coated with the particles.

Another embodiment of the present invention generally concerns a method for preparing a stable suspension of particles of two types, one having a first composition and the other having a second composition, in an aqueous medium. The method includes determining a pH range of the suspension in which the particles have a relatively low attraction to like particles as well as to unlike particles. Once the pH range for stability has been determined, a suspension of the particles having a pH in the stable pH range is prepared in the aqueous medium. Thereafter, if desired, the pH of the suspension may be adjusted to be outside the stable pH range to render the suspension unstable.

Still another embodiment of the present invention concerns a method for preparing an unstable suspension of particles of two types in an aqueous medium. The method includes determining a pH range of the suspension in which the particles are attracted to like and unlike particles.

The methods of the present invention are related to the information discussed in the paper, "Processing of FeAl/ $A_2O_3$ IMCs using Advanced Electrodeposition Methods", by B. A. Wilson, C. J. Suydam, M. J. Crimp, and M. A. Crimp, published in the *Materials Research Society Proceedings,* Vol. 288, for the symposium, "High-Temperature Ordered Intermetallic Alloys-V", 1993. The methods of the present invention are also related to the information disclosed in the paper entitled "Prediction of Composite spension Stability Based upon the HHF Interpretation" by B. A. Wilson and M. J. Crimp which has been accepted for publication in *Langmuir,* the American Chemical Society's Journal of Surfaces and Colloids. The methods of the present invention are also related to the information discussed in Michigan State University's Masters of Science Thesis, *Prediction of Colloidal Suspension Stability for SiC/Si$_3$N$_4$ and FeAl/Al$_2$O$_3$ Fiber Systems Using Material and System Parameters,* by Brett Allen Wilson, 1992, which thesis is hereby incorporated by reference.

In the first embodiment of the invention, which concerns preparing a suspension for coating a substrate with particles, the particles may be in any form, such as powder, platelets, or whiskers. The particles are generally insoluble in the aqueous medium used for forming the suspension. Particles especially suitable for the present invention have a particle size of up to about one hundred (100) microns, preferably, up to about fifty (50) microns, and, more preferably, up to about ten (10) microns. Optimally, the particles have a particle size between 0.1 and 10 microns. Best results are achieved with particles having narrow size distributions.

The particles may be metallic, semimetallic, nonmetallic, such as carbon, or ceramic, such as silicon nitride, silicon carbide, aluminum oxide, and yttrium oxide. Of the metallic particles, intermetallic particles, i.e., multi-component particles in which the phase of the particles have a different crystalline structure than that of the pure components, may also be used in the present invention. Currently, the intermetallic particles of most interest are intermetallic aluminides. Examples of metals which may be combined with aluminum to form aluminides are nickel, iron, and cobalt.

In the first embodiment of the present invention, the diameter of the substrate is not critical. The substrate may be, e.g., particulates or reinforcement materials, such as fibers, cloth, or whiskers. Fibers are generally polycrystalline, may be chopped or continuous, and may be formed of any material, e.g., materials selected from the group consisting of aluminum oxide, silicon carbide, carbon, and "Nicalon" (a silicon-oxy-carbide). Typical reinforcing fibers are less than 3 mm in diameter. The present method is useful for coating multi-strand fiber bundles, e.g., those having 60–70 strands per bundle.

To determine the pH range which encourages the coating of the substrate with the particles and discourages particle/particle agglomeration, homostability and heterostability ratios of the system are determined at selected pH intervals over a chosen pH range. The optimum pH range of the suspension for coating the substrate with the particles is the range of pH in which homostability ratios are greater than $$V_A = -\frac{A_{\text{eff}}}{12}\left[\frac{y}{x^2 + xy + x} \right.$$

$10^{10}$ and the heterostability ratio is less than $10^{10}$. An example of a suitable pH range and intervals to analyze is every one-half pH from pH 2 to pH 11.

The stability ratios are determined according to the general equation:

$$W_{ij} = (a_i + a_j)\int_{(a_i + a_j)}^{\infty} \exp(V_T/kT)\,(dr/r^2).$$

The heterostability ratio for stability between the substrate (designated by subscript i="1") and the particles (designated by subscript j="2"), ($W_{12}$), is determined according to the following equation:

$$W_{12} = (a_1 + a_2)\int_{(a_1 + a_2)}^{\infty} \exp(V_T/kT)\,(dr/r^2). \tag{I}$$

The homostability ratio for substrate/substrate stability, ($W_{11}$), is determined according to the following equation:

$$W_{11} = 2a_1 \int_{2a_1}^{\infty} \exp(V_T/kT)\,(dr/r^2). \tag{II}$$

The homostability ratio for particle/particle stability, $W_{22}$, is determined according to the following equation:

$$W_{22} = 2a_2 \int_{2a_2}^{\infty} \exp(V_T/kT)\,(dr/r^2). \tag{III}$$

Various methods may be used to calculate the values of equations I, II, and III. One such method is determining the area under the curve for W vs. r from $r=(a_i+a_j)$ to a value in which W approaches zero.

In equations, (I), (II), and (III), the subscript "1" represents the substrate and the subscript "2" represents the particles, $a_1$ is the radius of the substrate and $a_2$ is the radius of the particle. The radii are determined as half the nonagglomerated diameter of the substrate or particle. Particle sizes may be determined by various suitable methods. The term, k, is Boltzmann's constant, T is the temperature of the suspension, and r is the distance from the center of component i to the center of component j, wherein i and j are the consecutive subscripts of the stability ratio being determined. For example, when $W_{12}$ is being determined, component i is the substrate and component j is the particle and r varies from $a_1+a_2$ to infinity. When $W_{11}$ is being determined, components i and j are both the substrate and r varies from $2a_1$ to infinity. When $W_{22}$ is being determined, components i and j are both the particles and r varies from $2a_2$ to infinity.

In equations (I), (II), and (III), $V_T$ is the total potential energy of the interaction between component i and component j. $V_T$ is determined by the following equation:

$$V_T = V_A + V_R \tag{IV}$$

wherein $V_A$ is the attractive energy between component i and component j and $V_R$ is the repulsive energy between component i and component j. $V_A$ and $V_R$ may be determined by any equation found in the literature which is said to calculate them. An example of an equation which calculates $V_A$ is as follows:

$$V_A = -\frac{A_{\text{eff}}}{12}\left[\frac{y}{x^2 + xy + x} + \frac{y}{x^2 + xy + x + y} + 2\log\frac{x^2 + xy + x}{x^2 + xy + x + y}\right]$$

In equation (V), $A_{\text{eff}}$ is the effective Hamaker constant, which may be calculated according to the following general equation:

$$A_{\text{eff}} = (A_i^{+e,fra\ 1/2} + ee - A_m^{+e,fra\ 1/2} + ee)(A_j^{+e,fra\ 1/2} + ee - A_m^{+e,fra\ 1/2} + ee); \tag{VI}$$

which represents the more specific equations:

$$A_{\text{eff}} = (A_1^{+e,fra\ 1/2} + ee - A_m^{+e,fra\ 1/2} + ee)(A_2^{+e,fra\ 1/2} + ee - A_m^{+e,fra\ 1/2} + ee); \tag{VI-A}$$

$$A_{\text{eff}} = (A_1^{+e,fra\ 1/2} + ee - A_m^{+e,fra\ 1/2} + ee)(A_1^{+e,fra\ 1/2} + ee - A_m^{+e,fra\ 1/2} + ee); \tag{VI-B}$$

$$A_{\text{eff}} = (A_2^{+e,fra\ 1/2} + ee - A_m^{+e,fra\ 1/2} + ee)(A_2^{+e,fra\ 1/2} + ee - A_m^{+e,fra\ 1/2} + ee). \tag{VI-C}$$

Equation (VI-A) is used in the calculations for $W_{12}$, equation (VI-B) is used in the calculations for $W_{11}$, and equation (VI-C) is used in the calculations for $W_{22}$.

In equations (VI-A)–(VI-C), $A_1$ is the Hamaker constant of the substrate, $A_2$ is the Hamaker constant of the particle, and $A_m$ is the Hamaker constant of the aqueous medium. The Hamaker constants of the substrate, the particle, and the aqueous medium may be found in the literature or calculated from the dielectric constant of the substrate, particle, or aqueous medium being considered. The equation which may be used for determining the Hamaker constant from knowing the dielectric constant is as follows:

$$A(kT) = 113.7 \frac{(\epsilon - 1)^2}{(\epsilon + 1)^{3/2} (\epsilon + 2)^{1/2}} \quad \text{(VII)}$$

wherein $\epsilon$ is the dielectric constant of the material being considered.

In equation (V), $y=(a_i+a_j)$, and $x=H/(a_i+a_j)$, wherein H is the interparticle separation distance which has a value from zero to infinity.

Examples of equations which calculate $V_R$ are as follows:

$$V_R = \epsilon_o \epsilon_R \pi \left( \frac{a_i a_j}{(a_i + a_j)} \right) (\zeta_i^2 + \zeta_j^2) * \left[ \frac{2\zeta_i \zeta_j}{\zeta_i^2 + \zeta_j^2} \ln \left( \frac{1 + \exp(-KH)}{1 - \exp(-KH)} \right) + \ln(1 - \exp(-2KH)) \right] \quad \text{(VIII)}$$

$$V_R = \epsilon_o \epsilon_R \pi \left( \frac{a_i a_j}{(a_i + a_j)} \right) (\zeta_i^2 + \zeta_j^2) * \left[ \frac{2\zeta_i \zeta_j}{\zeta_i^2 + \zeta_j^2} \ln \left( \frac{1 + \exp(-KH)}{1 - \exp(-KH)} \right) - \ln(1 - \exp(-2KH)) \right] \quad \text{(IX)}$$

In equations (VIII) and (IX), $\epsilon_o$ is permitivity in a vacuum (8.854E-12 coulomb/joule-meter), $\epsilon_R$ is relative permitivity of the aqueous medium which may be found in the literature or calculated from the dielectric constant according to the equation, $\epsilon = \epsilon_o \epsilon_R$. $\zeta$ is the substrate's or particle's zeta potential, and K is the Debye-Huckel parameter for the indifferent electrolyte. The indifferent electrolyte is discussed in detail hereinbelow. The Debye-Huckel parameter for the indifferent electrolyte may be calculated by the following equation:

$$K^2 = e^2 \Sigma n_q^o z_q / kT \quad \text{(X)}$$

In equation (X), e is electron charge (1.602E- 19 coulombs), $n_q^o$ is the number of ions of type q in the bulk, and $z_q$ is the valence of ion q. For example, if the indifferent electrolyte used is NaCl, the ions are $Na^{+1}$ and $Cl^{-1}$. Therefore, when $q=Na^{+1}$, $n_q^o z_q$ is the concentration of sodium ions times the charge of a sodium ion (+1) When $i=Cl^{-1}$, $n_q^o z_q$ is the concentration of chloride ions times the charge of a chloride ion (−1).

For equations (VIII) or (IX), zeta potentials for the substrate and the particle are empirically determined by suitable equipment at the pH intervals desired. Electrokinetic sonic amplitude zeta potentials may be determined by the Matec Electroacoustic Sonic Amplitude-8000 system available from Matec Applied Sciences, Hoppington, Mass., or electrophoresis zeta potentials may be determined using a PEN-KEM SYSTEM 3000 automated electrokinetics analyzer available from PEN KEM, Bedford Hills, N.Y. The zeta potentials are preferably determined in a suspension having an electrolyte concentration less than the critical coagulation concentration which is discussed below. For the most accurate zeta potential values, the zeta potentials should be determined at each pH using a new suspension prepared to have the pH desired.

To determine the zeta potential of substrates such as fibers, which have lengths greater than one hundred (100) microns, it is preferred that the substrate be ground to a length of less than one hundred (100) microns. For example, fibers may be ball-milled to reduce the fiber length.

The critical coagulation concentration of the suspended particles is the concentration of an indifferent electrolyte in the aqueous medium that will result in rapid coagulation. An indifferent electrolyte, when part of a solution or suspension, keeps the ion concentration constant even through changes in the pH of the solution or suspension. Indifferent electrolytes involve the adsorption of non-specifically adsorbed ions. Examples of indifferent electrolytes include alkali nitrates, such as, $KNO_3$ (potassium nitrate) and alkali halides, such as, NaCl (sodium chloride).

The critical coagulation concentration of the suspended particles may be determined by (a) preparing 0.0001N, 0.001N, 0.01N, and 0.1N solutions of an indifferent electrolyte, (b) adding about two (2) volume percent of the particles to each of the four solutions to form suspensions, (c) mixing the four suspensions, e.g., by sonication, (d) allowing the mixed suspensions to rest undisturbed for a period of time, e.g., about two (2) hours, (e) shaking the rested suspensions, (f) allowing the shaken suspensions to rest again, and (g) observing the resting suspensions. The critical coagulation concentration is estimated to be a concentration between (i) the concentration of the suspension which attains a supernatant or "clear" state and (ii) the concentration in which the particles remain suspended.

One method of determining values for $V_T$ is by determining the area under the curve of $V_T$ vs. interparticle separation distance (H) from zero to a value in which $V_T$ approaches zero.

Suspensions having more than one type of particle to coat a substrate may also be prepared according to the principles of the present invention. The equations discussed above would change to reflect the additional particle types. For example, if two types of particles were used, in addition to the stability ratios given above, one would calculate the homostability ratio for the second particle type (designated by subscript "3"), $W_{33}$; the heterostability ratio for the substrate and the second particle type, $W_{13}$; the heterostability ratio for the two particle types, $W_{23}$; and the heterostability ratio for the substrate and the two particles, $W_{123}$.

Once the calculations above have been completed, values of log W vs. pH may be graphically plotted and analyzed to determine the pH range in which the heterostability ratio is less than $10^{10}$ and the homostability ratios are greater than $10^{10}$.

To prepare the suspension of the particles to coat the substrate, an indifferent electrolyte is added to an aqueous medium at less than the critical coagulation concentration described hereinabove to form a solution. The pH of the solution is then adjusted with a pH adjuster, that is, an acid or a base. Acids that may be used to adjust the pH include $HNO_3$. Bases that may be used to adjust the pH include KOH. The acid or base is selected along with the indifferent electrolyte so that the pH adjuster and the indifferent electrolyte in water forms water and the indifferent electrolyte, so that disposal of the used aqueous medium is made simpler and gentler on the environment as additional substances are not introduced into the suspension prepared by the present invention. For example, if $KNO_3$ is used as the indifferent electrolyte, the base would preferably be KOH and the acid would preferably be $HNO_3$.

Once the pH has been adjusted, the particles are then added to the aqueous medium usually in quantities up to about 50 volume percent, more typically, from about 30 to about 40 volume percent.

Once the suspension of the particles has been prepared, the substrate may be coated with the particles by exposing the substrate to the suspension, e.g., by dipping the substrate in the suspension. The substrate needs to be exposed for a sufficient time to allow some coating of the substrate with the particles. Generally, the length of time needed for exposure is less than one minute.

The temperature of the suspension during the coating operation is not critical and may be, for example, from greater than 0° to about 100° C.

Using the method of the present invention, the particle is coated onto the substrate from about 1 to about 80 weight percent, based on the weight of the substrate.

If fibers are used, after coating the fibers, the fibers are typically stacked, cut, dried and then treated to form a matrix composite material. The treatment after drying may include sintering, hot isostatic pressing (HIPing), or vacuum hot pressing.

As mentioned above, the second embodiment of the present invention concerns forming stable suspensions of particles of a first composition and particles of a second composition in an aqueous medium. The embodiment entails determining a pH range of the suspension in which the particles have a relatively low attraction to like and unlike particles. Once the stable pH range has been determined, a suspension of the particles having a pH in the stable pH range is prepared in the aqueous medium.

The third embodiment of the present invention concerns forming unstable suspensions of particles of a first composition and particles of a second composition in an aqueous medium. An example of an unstable suspension is a suspension containing loosely-bound agglomerates of the particles. The embodiment entails determining a pH range of the suspension in which the particles are attracted to like and unlike particles. Once the unstable pH range has been determined, a suspension of the particles having a pH in the unstable pH range is prepared in the aqueous medium.

The particles and the aqueous medium of the second and third embodiments of the invention are the same as those described above for the first embodiment of the invention.

To determine the pH range in which the particles are stable or unstable in the aqueous medium, homostability and heterostability ratios of the system are determined as described above, except that the subscript "1" designates the particles of the first composition and the subscript "2" designates the particles of the second composition. The stable pH range of the suspension of the particles is the range of pH in which both the homostability and the heterostability ratios are greater than $10^{10}$. The unstable pH range of the suspension of the particles is the range of pH in which the homostability and the heterostability ratios are each less than $10^{10}$.

Suspensions having particles of more than two compositions may also be prepared according to the present invention. The equations discussed above would change to reflect the additional particle type(s). For example, if three types of particles were used, in addition to the stability ratios discussed above, one would calculate the homostability ratio for the third particle type (designated by subscript "3"), $W_{33}$; the heterostability ratio for the first and third particle type, $W_{13}$; the heterostability ratio for the second and third particle types, $W_{23}$; and the heterostability ratio for the first, second, and third particle types, $W_{123}$.

For some applications, the total stability ratio, $W_T$, for the system may be useful. The equation for determining $W_T$ is as follows:

$$W_T = \left[ \frac{n^2}{W_{11}} + \frac{(1-n)^2}{W_{22}} + \frac{2n(1-n)}{W_{12}} \right]^{-1} \quad (XI)$$

wherein n is the number fraction of the substrate or first particle type to the second particle type which is determined by the following equation:

$$n = \left\{ \frac{a_1^3(1-RVFC)}{a_2^3 RVFC} + 1 \right\}^{-1}$$

wherein RVFC is the relative volume fraction of the components, i.e., either the relative volume fraction of the substrate to the particles or of the particles of the first composition to the particles of the second composition. For a stable suspension, $W_T$ has a value greater than $10^{10}$, and for an unstable suspension, $W_T$ has a value less than $10^{10}$.

Once the calculations above have been completed, values of log W vs. pH may be graphically plotted and analyzed to determine the pH range in which the heterostability and the homostability ratios are greater than $10^{10}$ or less than $10^{10}$, as appropriate.

In the preparation of the stable or unstable suspensions, the addition of the indifferent electrolyte and the pH adjustment follow the same procedures as discussed above for the first embodiment of the invention. The stable suspension of the particles could be made unstable, as desired, by adjusting the pH to be outside the stable pH range and vice versa.

Accordingly, the method of the present invention is useful for preparing suspensions for coating a substrate, such as fibers, with particles to ultimately make uniform composites of the coated substrate. The method of the present invention is also useful for preparing stable suspensions of particles of a first composition and particles of a second composition which are easily altered to form unstable suspensions and vice versa.

The following examples are illustrative only and should not be construed as limiting the invention which is properly delineated in the appended claims.

EXAMPLES

In this example, a stable suspension of SiC and $Si_3N_4$ powders was prepared according to the present invention. The SiC powder used was an alpha-SiC powder, UF-10, available from Lonza Ltd., Fairlawn, N.J., having a particle size of 1.8 microns. The $Si_3N_4$ powder used was an alpha-$Si_3N_4$ powder, SN-E10, available from UBE Industries, N.Y., N.Y., having a particle size of 0.5 microns. The Hamaker constants were determined to be $3.0 \times 10^{-19}$ Joules and $1.6 \times 10^{-19}$ Joules for SiC and $Si_3N_4$, respectively.

The zeta potentials of SiC and of $Si_3N_4$ powder were determined using a PEN-KEM SYSTEM 3000 automated electrokinetics analyzer. Each type of powder was suspended at a level of 0.01 volume percent in deionized water which had an electrolyte concentration of $10^{-3}$M $KNO_3$ which is less than the critical coagulation concentration of the suspensions. Zeta potentials were determined every ½ pH from pH 2 to pH 11, varying the pH by addition of $HNO_3$ and KOH. The suspensions were dispersed using an ultrasonic probe to eliminate particle agglomeration.

The resulting zeta potentials vs. pH are provided in the graph of FIG. 1. The curves in FIG. 1 and FIG. 2 are computer-drawn best-fit curves for the given data points. In FIG. 1, the data for SiC from pH 2 to 5 are actual measurements. The data shown for above pH 5 was obtained from a logarithmic regression completed using the data from pH 2 to 5.

The heterostability and homostability ratios were calculated using equation (VIII) for $V_R$ and a relative volume fraction of the powders of 0.5. The results of the calculations are shown graphically as log W vs. pH in FIG. 2.

As discussed above, stable suspensions with respect to agglomeration have a pH in which log $W_{11}$, log $W_{22}$, and log $W_{12}$ are each greater than 10. According to FIG. 2, log $W_{11}$ for SiC/SiC interaction is greater than 10 at pH 4–11, log $W_{22}$ for $Si_3N_4/Si_3N_4$ interaction is greater than 10 at pH 4–5.5 and 7–11, and log $W_{12}$ for SiC/$Si_3N_4$ interaction is greater than 10 at pH 7–11. The range of pH in which all three log W values are greater than 10 is at pH 7–11.

Suspensions of SiC and $Si_3N_4$ powders were prepared having a relative volume fraction of the powders of 0.5 and a concentration of indifferent electrolyte $KNO_3$ of $10^{-3}$ M at pH 7 and 8. After 24 hours, the percent of the sample sedimented at pH 7 was about 24% and at pH 8, about 10%, indicating relatively stable suspensions of SiC and $Si_3N_4$.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method for preparing a suspension for coating a substrate with intermetallic particles, comprising:

determining a pH range in which (i) the heterostability ratio ($W_{12}$) of the substrate and the intermetallic particles in an aqueous medium is defined by the equation:

$$W_{12} = (a_1 + a_2) \int_{(a_1 + a_2)}^{\infty} \exp(V_T/kT) \, (dr/r^2)$$

is less than $10^{10}$, (ii) the homostability ratio ($W_{11}$) of the substrate in the aqueous medium is defined by the equation:

$$W_{11} = 2a_1 \int_{2a_1}^{\infty} \exp(V_T/kT) \, (dr/r^2)$$

greater than $10^{10}$, and (iii) the homostability ratio ($W_{22}$) of the intermetallic particles in the aqueous medium, defined by the equation:

$$W_{22} = 2a_2 \int_{2a_2}^{\infty} \exp(V_T/kT) \, (dr/r^2)$$

is greater than $10^{10}$, wherein subscript "1" represents the substrate, subscript "2" represents the intermetallic particles, $a_1$ is the radius of the substrate, $a_2$ is the radius of the intermetallic particles, $V_T = V_A + V_R$ wherein $V_A$ is the attractive energy between component i and component j and $V_A$ is not a function of the zeta potentials of the components, wherein i and j are the consecutive subscripts of the stability ratio being considered, $$V_R = \epsilon_o \epsilon_R \pi \left( \frac{(a_i a_j)}{(a_i + a_j)} \right) (\zeta_i^2 + \zeta_j^2) *$$
$$\left[ \frac{2\zeta_i \zeta_j}{\zeta_i^2 + \zeta_j^2} \ln \left( \frac{1 + \exp(-KH)}{1 - \exp(-KH)} \right) + \ln(1 - \exp(-2KH)) \right]$$

$[2\zeta_i\zeta_j/\zeta_i^2+\zeta_j^2 ln(1+exp(-KH)/1-exp \quad (-KH))+ln(1-exp(-2KH))]$ wherein $\epsilon_o$ is permitivity in a vacuum, $\epsilon_R$ is relative permitivity of the aqueous medium, $a_i$ is the radius of component i, $a_j$ is the radius of component j, zeta is the zeta potential of the specified component, K is the Debye-Huckel parameter for the indifferent electrolyte, H is the intercomponent separation distance which has a value from zero to infinity, T is the temperature at which the method is to be performed, k is Boltzmann's constant, and r is distance which varies from $a_i+a_j$ to infinity; and preparing a suspension of the intermetallic particles in the aqueous medium having a pH in the determined pH range.

2. A method as set forth in claim 1, wherein a diameter of the particles is less than 100 microns.

3. A method for preparing a suspension for coating ceramic fibers with intermetallic particles, comprising:

determining a pH range in which (i) the heterostability ratio ($W_{12}$) of the ceramic fibers and the intermetallic particles in an aqueous medium is defined by the equation:

$$W_{12} = (a_1 + a_2) \int_{(a_1 + a_2)}^{\infty} \exp(V_T/kT) \, (dr/r^2)$$

is less than $10^{10}$, (ii) the homostability ratio ($W_{11}$) of the ceramic fibers in the aqueous medium is defined by the equation:

$$W_{11} = 2a_1 \int_{2a_1}^{\infty} \exp(V_T/kT) \, (dr/r^2)$$

is greater than $10^{10}$, and (iii) the homostability ratio ($W_{22}$) of the intermetallic particles in the aqueous medium is defined by the equation:

$$W_{22} = 2a_2 \int_{2a_2}^{\infty} \exp(V_T/kT) \, (dr/r^2)$$

is greater than $10^{10}$, wherein subscript "1" represents the ceramic fibers, subscript "2" represents the intermetallic particles, $a_1$ is the radius of the ceramic fibers, $a_2$ is the radius of the intermetallic particles, $V_T=V_A+V_R$ wherein $V_A$ is the attractive energy between component i and component j and $V_A$ is not a function of the zeta potentials of the components, wherein i and j are the consecutive subscripts of the stability ratio being considered, $$V_R = \epsilon_o \epsilon_R \pi \left( \frac{(a_i a_j)}{(a_i + a_j)} \right) (\zeta_i^2 + \zeta_j^2) *$$
$$\left[ \frac{2\zeta_i \zeta_j}{\zeta_i^2 + \zeta_j^2} \ln \left( \frac{1 + \exp(-KH)}{1 - \exp(-KH)} \right) + \ln(1 - \exp(-2KH)) \right]$$

$[2\zeta_i\zeta_j/\zeta_i^2+\zeta_j ln(1+exp(-KH)/1-exp \quad (-KH))+ln(1-exp(-2KH))]$ wherein $\epsilon_o$ is permitivity in a vacuum, $\epsilon_R$ is relative permitivity of the aqueous medium, $a_i$ is the radius of component i, $a_j$ is the radius of component j, zeta is the zeta potential of the specified component, K is the Debye-Huckel parameter for the indifferent electrolyte, H is the intercomponent separation distance which has a value from zero to infinity, T is the temperature at which the method is to be performed, k is Boltzmann's constant, and r is distance which varies from $(a_i+a_j)$ to infinity; and preparing a suspension of the intermetallic particles in the aqueous medium having a pH in the determined pH range.

4. A method as set forth in claim 3, wherein a diameter of the particles is less than 100 microns.

5. A method for preparing a suspension of intermetallic particles and coating a substrate with the suspended particles, comprising:

determining a pH range in which (i) the heterostability ratio ($W_{12}$) of the substrate and the intermetallic particles in an aqueous medium is defined by the equation:

$$W_{12} = (a_1 + a_2) \int_{(a_1+a_2)}^{\infty} \exp(V_T/kT)\,(dr/r^2)$$

is less than $10^{10}$, (ii) the homostability ratio ($W_{11}$) of the substrate in the aqueous medium is defined by the equation:

$$W_{11} = 2a_1 \int_{2a_1}^{\infty} \exp(V_T/kT)\,(dr/r^2)$$

is greater than $10^{10}$, and (iii) the homostability ratio ($W_{22}$) of the intermetallic particles in the aqueous medium is defined by the equation:

$$W_{22} = 2a_2 \int_{2a_2}^{\infty} \exp(V_T/kT)\,(dr/r^2)$$

is greater than $10^{10}$, wherein the subscript "1" represents the substrate, the subscript "2" represents the intermetallic particles, $a_1$ is the radius of the substrate, $a_2$ is the radius of the intermetallic particles, $V_T = V_A + V_R$ wherein $V_A$ is the attractive energy between component i and component j and $V_A$ is not a function of the zeta potentials of the components, wherein i and j are the consecutive subscripts of the stability ratio being considered, $$V_R = \epsilon_o \epsilon_R \pi \left( \frac{(a_i a_j)}{(a_i + a_j)} \right) (\zeta_i^2 + \zeta_j^2) * \left[ \frac{2\zeta_i \zeta_j}{\zeta_i^2 + \zeta_j} \ln\left( \frac{1 + \exp(-KH)}{1 - \exp(-KH)} \right) + \ln(1 - \exp(-2KH)) \right]$$

$[2\zeta_i\zeta_j/\zeta_i^2+\zeta_j \ln(1+exp(-KH)/1-exp\ (-KH))+\ln(1-exp(-2KH))]$
wherein $\epsilon_o$ is permitivity in a vacuum, $\epsilon_R$ is relative permitivity of the aqueous medium, $a_i$ is the radius of component i, $a_j$ is the radius of component j, zeta is the zeta potential of the specified component, K is the Debye-Huckel parameter for the indifferent electrolyte, H is the intercomponent separation distance which has a value from zero to infinity, T is the temperature at which the method is to be performed, k is Boltzmann's constant, and r is distance which varies from $(a_i+a_j)$ to infinity;

preparing a suspension of the intermetallic particles in the aqueous medium having a pH in the determined pH range; and exposing the substrate to the suspension whereby the intermetallic particles coat the substrate.

6. A method as set forth in claim 5, wherein the substrate is in the form of fibers.

7. A method as set forth in claim 5, wherein the substrate is in the form of ceramic fibers.

8. A method as set forth in claim 5, wherein the intermetallic particles are formed of at least two metals.

9. A method as set forth in claim 5, wherein the particles have a diameter of at most 100 microns.

10. A method for preparing a suspension of intermetallic particles and coating ceramic fibers with the suspended intermetallic particles, comprising:

determining a pH range in which (i) the heterostability ratio ($W_{12}$) of the ceramic fibers and the intermetallic particles in an aqueous medium is defined by the equation:

$$W_{12} = (a_1 + a_2) \int_{(a_1+a_2)}^{\infty} \exp(V_T/kT)\,(dr/r^2)$$

is less than $10^{10}$, (ii) the homostability ratio ($W_{11}$) of the ceramic fibers in the aqueous medium is defined by the equation:

$$W_{11} = 2a_1 \int_{2a_1}^{\infty} \exp(V_T/kT)\,(dr/r^2)$$

is greater than $10^{10}$, and (iii) the homostability ratio ($W_{22}$) of the intermetallic particles in the aqueous medium, defined by the equation:

$$W_{22} = 2a_2 \int_{2a_2}^{\infty} \exp(V_T/kT)\,(dr/r^2)$$

is greater than $10^{10}$, wherein subscript "1" represents the ceramic fibers, subscript "2" represents the intermetallic particles, $a_1$ is the radius of the ceramic fibers, $a_2$ is the radius of the intermetallic particles, $V_T = V_A + V_R$ wherein $V_A$ is the attractive energy between component i and component j and $V_A$ is not a function of the zeta potentials of the components, wherein i and j are the consecutive subscripts of the stability ratio being considered, $$V_R = \epsilon_o \epsilon_R \pi \left( \frac{(a_i a_j)}{(a_i + a_j)} \right) (\zeta_i^2 + \zeta_j^2) * \left[ \frac{2\zeta_i \zeta_j}{\zeta_i^2 + \zeta_j} \ln\left( \frac{1 + \exp(-KH)}{1 - \exp(-KH)} \right) + \ln(1 - \exp(-2KH)) \right]$$

$[2\zeta_i\zeta_j/\zeta_i^2+\zeta_j \ln(1+exp(-KH)/1-exp\ (-KH))+\ln(1-exp(-2KH))]$
wherein $\epsilon_o$ is permitivity in a vacuum, $\epsilon_R$ is relative permitivity of the aqueous medium, $a_i$ is the radius of component i, $a_j$ is the radius of component j, zeta is the zeta potential of the specified component, K is the Debye-Huckel parameter for the indifferent electrolyte, H is the intercomponent separation distance which has a value from zero to infinity, T is the temperature at which the method is to be performed, k is Boltzmann's constant, and r is distance which varies from $a_i+a_j$ to infinity;

preparing a suspension of the intermetallic particles in the aqueous medium having a pH in the determined pH range; and exposing the ceramic fibers to the suspension whereby the intermetallic particles coat the ceramic fibers.

11. A method as set forth in claim 10, wherein a diameter of the particles is at most 100 microns.

12. A method for preparing a suspension containing particles of a first composition and particles of a second composition, comprising:

determining a pH range in which (i) the heterostability ratio ($W_{12}$) of the particles of the first composition and the particles of the second composition in an aqueous medium is defined by the equation:

$$W_{12} = (a_1 + a_2) \int_{(a_1+a_2)}^{\infty} \exp(V_T/kT)\, (dr/r^2)$$

is greater than $10^{10}$, (ii) the homostability ratio ($W_{11}$) of the particles of the first composition in the aqueous medium is defined by the equation:

$$W_{11} = 2a_1 \int_{2a_1}^{\infty} \exp(V_T/kT)\, (dr/r^2)$$

is greater than $10^{10}$, and (iii) the homostability ratio ($W_{22}$) of the particles of the second composition in the aqueous medium is defined by the equation:

$$W_{22} = 2a_2 \int_{2a_2}^{\infty} \exp(V_T/kT)\, (dr/r^2)$$

is greater than $10^{10}$, wherein subscript "1" represents the particles of the first composition, subscript "2" represents the particles of the second composition, $a_1$ is the radius of the particles of the first composition, $a_2$ is the radius of the particles of the second composition, $V_T = V_A + V_R$ wherein $V_A$ is the attractive energy between component i and component j and $V_A$ is not a function of the zeta potentials of the components, wherein i and j are the consecutive subscripts of the stability ratio being considered, $$V_R = \epsilon_o \epsilon_R \pi \left( \frac{(a_i a_j)}{(a_i + a_j)} \right) (\zeta_i^2 + \zeta_j^2) * \left[ \frac{2\zeta_i \zeta_j}{\zeta_i^2 + \zeta_j} \ln\left( \frac{1 + \exp(-KH)}{1 - \exp(-KH)} \right) + \ln(1 - \exp(-2KH)) \right]$$

$[2\zeta_i\zeta_j/\zeta_i^2+\zeta_j \ln(1+exp(-KH)/1-exp\ (-KH))+\ln(1-exp(-2KH))]$ wherein $\epsilon_o$ is permitivity in a vacuum, $\epsilon_R$ is relative permitivity of the aqueous medium, $a_i$ is the radius of component i, $a_j$ is the radius of component j, zeta is the zeta potential of the specified component, K is the Debye-Huckel parameter for the indifferent electrolyte, H is the intercomponent separation distance which has a value from zero to infinity, T is the temperature at which the method is to be performed, k is Boltzmann's constant, and r is distance which varies from $(a_i+a_j)$ to infinity; and forming a suspension of the particles of the first and second compositions in the aqueous medium having a pH in the determined pH range.

13. A method as set forth in claim 12, wherein particles of the first and second compositions have diameters of at most 100 microns.

14. A method for preparing a suspension containing particles of a first composition and particles of a second composition, comprising:

determining a pH range in which (i) the heterostability ratio ($W_{12}$) of the particles of the first composition and the particles of the second composition in an aqueous medium is defined by the equation:

$$W_{12} = (a_1 + a_2) \int_{(a_1+a_2)}^{\infty} \exp(V_T/kT)\, (dr/r^2)$$

is less than $10^{10}$, (ii) the homostability ratio ($W_{11}$) of the particles of the first composition in the aqueous medium is defined by the equation:

$$W_{11} = 2a_1 \int_{2a_1}^{\infty} \exp(V_T/kT)\, (dr/r^2)$$

is less than $10^{10}$, and (iii) the homostability ratio ($W_{22}$) of the particles of the second composition in the aqueous medium is defined by the equation:

$$W_{22} = 2a_2 \int_{2a_2}^{\infty} \exp(V_T/kT)\, (dr/r^2)$$

is less than $10^{10}$, wherein the subscript "1" represents the particles of the first composition, the subscript "2" represents the particles of the second composition, $a_1$ is the radius of the particles of the first composition, $a_2$ is the radius of the particles of the second composition, $V_T = V_A + V_R$ wherein $V_A$ is the attractive energy between component i and component j and $V_A$ is not a function of the zeta potentials of the components, wherein i and j are the consecutive subscripts of the stability ratio being considered, $$V_R = \epsilon_o \epsilon_R \pi \left( \frac{(a_i a_j)}{(a_i + a_j)} \right) (\zeta_i^2 + \zeta_j^2) * \left[ \frac{2\zeta_i \zeta_j}{\zeta_i^2 + \zeta_j} \ln\left( \frac{1 + \exp(-KH)}{1 - \exp(-KH)} \right) + \ln(1 - \exp(-2KH)) \right]$$

$[2\zeta_i\zeta_j/\zeta_i^2+\zeta_j \ln(1+exp(-KH)/1-exp\ (-KH))+\ln(1-exp(-2KH))]$ wherein $\epsilon_o$ is permitivity in a vacuum, $\epsilon_R$ is relative permitivity of the aqueous medium, $a_i$ is the radius of component i, $a_j$ is the radius of component j, zeta is the zeta potential of the specified component, K is the Debye-Huckel parameter for the indifferent electrolyte, H is the intercomponent separation distance which has a value from zero to infinity, T is the temperature at which the method is to be performed, k is Boltzmann's constant, and r is distance which varies from $(a_i+a_j)$ to infinity; and forming a suspension of the particles of the first and second compositions in the aqueous medium having a pH in the determined pH range.

15. A method as set forth in claim 14, wherein the particles of the first and second compositions are formed of ceramic.

16. A method as set forth in claim 14, wherein particles of the first and second compositions have diameters of at most 100 microns.

\* \* \* \* \*

UNITED STATES PATENT AND TRADEMARK OFFICE
CERTIFICATE OF CORRECTION

PATENT NO. : 5,545,428  Page 1 of 4
DATED : August 13, 1996
INVENTOR(S) : Crimp et al.

It is certified that error appears in the above-indentified patent and that said Letters Patent is hereby corrected as shown below:

Column 6, line 3, "(II)", should be -- (III) --.

Columns 5 & 6, lines 36 and 37, $$V_A = -\frac{A_{eff}}{12}\left[\frac{y}{x_2+xy+x}+\frac{y}{x^2+xy+x+y}+2\log\frac{x_2+xy+x}{x^2+xy+x+y}\right](V)$$

should be in Column 6 after -- as follows: --.

Column 6, lines 43 and 44

$$A_{eff} = (A_i^{+efra^{1/2}}+ee-A_m^{+efra^{1/2}}+ee)(A_2^{+efra^{1/2}}+ee-A_m^{+efra^{1/2}}+ee)$$

should be $$A_{eff} = (A_i^{1/2}-A_m^{1/2})(A_j^{1/2}-A_m^{1/2})$$

UNITED STATES PATENT AND TRADEMARK OFFICE
CERTIFICATE OF CORRECTION

Page 2 of 4

PATENT NO. : 5,545,428
DATED : August 13, 1996
INVENTOR(S) : Crimp et al.

It is certified that error appears in the above-indentified patent and that said Letters Patent is hereby corrected as shown below:

Column 6, lines 48 and 49

$$A_{eff} = (A_i^{+efra^{1/2}} + ee - A_m^{+efra^{1/2}} + ee)(A_2^{+efra^{1/2}} + ee - A_m^{+efra^{1/2}} + ee)$$

should be $$A_{eff} = (A_1^{1/2} - A_m^{1/2})(A_2^{1/2} - A_m^{1/2})$$

Column 6, lines 51 and 52

$$A_{eff} = (A_i^{+efra^{1/2}} + ee - A_m^{+efra^{1/2}} + ee)(A_2^{+efra^{1/2}} + ee - A_m^{+efra^{1/2}} + ee)$$

should be $$A_{eff} = (A_1^{1/2} - A_m^{1/2})(A_1^{1/2} - A_m^{1/2})$$

UNITED STATES PATENT AND TRADEMARK OFFICE
CERTIFICATE OF CORRECTION

PATENT NO. : 5,545,428  
DATED : August 13, 1996  
INVENTOR(S) : Crimp et al.

Page 3 of 4

It is certified that error appears in the above-indentified patent and that said Letters Patent is hereby corrected as shown below:

Column 6, lines 54 and 55

$$A_{eff} = (A_2^{+efra\frac{1}{2}} + ee - A_m^{+efra\frac{1}{2}} + ee)(A_2^{+efra\frac{1}{2}} + ee - A_m^{+efra\frac{1}{2}} + ee)$$

should be $$A_{eff} = (A_2^{\frac{1}{2}} - A_m^{\frac{1}{2}})(A_2^{\frac{1}{2}} - A_m^{\frac{1}{2}})$$

UNITED STATES PATENT AND TRADEMARK OFFICE
CERTIFICATE OF CORRECTION

PATENT NO.   : 5,545,428
DATED        : August 13, 1996
INVENTOR(S)  : Crimp et al It is certified that error appears in the above-indentified patent and that said Letters Patent is hereby corrected as shown below:

insert    Column 11, Claim 1, line 44, before "greater" -- is --.

insert    Column 15, Claim 13, line 50, after "wherein" -- the --.

insert    Column 16, Claim 16, line 55, after "wherein" -- the --.

Signed and Sealed this

Fourth Day of February, 1997

Attest:

Attesting Officer

BRUCE LEHMAN
Commissioner of Patents and Trademarks